(12) United States Patent
Bartz et al.

(10) Patent No.: US 9,560,037 B2
(45) Date of Patent: Jan. 31, 2017

(54) INTEGRATED APIS AND UIS FOR CONSUMING SERVICES ACROSS DIFFERENT DISTRIBUTED NETWORKS

(71) Applicant: Microsoft Corporation, Redmond, WA (US)

(72) Inventors: Bradley J. Bartz, Woodinville, WA (US); Vladimir Pogrebinsky, Redmond, WA (US); Sata Busayarat, Redmond, WA (US); Ryan Jones, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 14/309,846

(22) Filed: Jun. 19, 2014

(65) Prior Publication Data

US 2015/0373012 A1 Dec. 24, 2015

(51) Int. Cl.
*H04L 29/06* (2006.01)
*H04L 29/08* (2006.01)
*G06F 3/0482* (2013.01)
*G06F 9/50* (2006.01)
*G06F 9/54* (2006.01)

(52) U.S. Cl.
CPC ......... *H04L 63/0823* (2013.01); *G06F 3/0482* (2013.01); *G06F 9/5072* (2013.01); *G06F 9/541* (2013.01); *H04L 63/0272* (2013.01); *H04L 67/10* (2013.01); *H04L 67/16* (2013.01); *H04L 67/20* (2013.01); *H04L 67/36* (2013.01)

(58) Field of Classification Search
CPC ...... G06F 9/5072; G06F 9/541; G06F 3/0482; H04L 67/10; H04L 67/36; H04L 63/0823; H04L 67/16; H04L 67/20; H04L 63/0272
See application file for complete search history.

(56) References Cited

U.S. PATENT DOCUMENTS

| | | |
|---|---|---|
| 8,781,104 B1 * | 7/2014 | Allen ............... H04L 12/1403 379/201.01 |
| 2011/0138453 A1 | 6/2011 | Verma et al. |
| 2011/0153727 A1 | 6/2011 | Li |

(Continued)

FOREIGN PATENT DOCUMENTS

| | | |
|---|---|---|
| KR | 20130059593 A | 6/2013 |
| WO | 2013071087 A1 | 5/2013 |
| WO | 2014007811 A1 | 1/2014 |

OTHER PUBLICATIONS

Otixo, "Your Dashboard for the Cloud", web site, (available at: http://otixo.com/product), Published on: Jun. 16, 2011, (2 pages).

(Continued)

*Primary Examiner* — Amir Mehrmanesh
(74) *Attorney, Agent, or Firm* — Ben Tabor; Kate Drakos; Micky Minhas

(57) ABSTRACT

User interface integration across multiple clouds is achieved by hosting UI extensions for different services in the same browser window. The UI extensions are initialized by a shell with any necessary security context for the corresponding cloud. The shell provides versioning so that the newest version of the UI is presented to users for all versions of a service. A connector in a local cloud provides translation between APIs across different clouds.

20 Claims, 4 Drawing Sheets

(56) References Cited

U.S. PATENT DOCUMENTS

| | | | |
|---|---|---|---|
| 2011/0276951 A1* | 11/2011 | Jain | G06F 11/3006 717/140 |
| 2012/0159517 A1 | 6/2012 | Shen et al. | |
| 2012/0204169 A1 | 8/2012 | Breiter et al. | |
| 2012/0233589 A1 | 9/2012 | Mruthyunjaya et al. | |
| 2012/0324069 A1 | 12/2012 | Nori et al. | |
| 2013/0066940 A1* | 3/2013 | Shao | H04L 67/1025 709/201 |
| 2013/0282748 A1 | 10/2013 | Liensberger et al. | |
| 2013/0283364 A1* | 10/2013 | Chang | H04L 49/70 726/12 |
| 2013/0291121 A1 | 10/2013 | Iovanov et al. | |
| 2014/0059226 A1 | 2/2014 | Messerli et al. | |
| 2014/0101676 A1 | 4/2014 | Lovegrove et al. | |
| 2014/0198909 A1* | 7/2014 | Allen | H04L 12/1403 379/265.09 |
| 2014/0278623 A1* | 9/2014 | Martinez | G06F 8/36 705/7.12 |
| 2015/0163288 A1* | 6/2015 | Maes | H04L 67/10 709/203 |

OTHER PUBLICATIONS

Cisco, "Cisco InterCloud", web site, (available at: http://www.cisco.com/c/en/us/products/switches/intercloud/index.html), Published on: Mar. 31, 2014, (2 pages).

Hojoki GMBH, "CatchApp," web site, (available at: https://getcatchapp.com/hojoki/#monitor), Published on: Feb. 8, 2014, (4 pages).

Okta, "okta—Simple and Complete: For IT and End Users", web site (available at: https://www.okta.com/what-we-do/single-sign-on.html), Published on: Jan. 19, 2012, (5 pages).

Eurpoean Patent Office, "Notification of Transmittal of the International Search Report and the Written Opinion of the International Searching Authority," issued in PCT Application No. PCT/US2015/036111, mailed date: Jan. 20, 2016, 19 Pages.

"International Preliminary Report on Patentability Issued in PCT Application No. PCT/US2015/036111", Mailed Date: Jul. 20, 2016, 5 Pages.

"International Preliminary Report on Patentability Issued in PCT Application No. PCT/US2015/036111", Mailed Date: Nov. 3, 2016, 11 Pages.

* cited by examiner

INTEGRATED APIS AND UIS FOR CONSUMING SERVICES ACROSS DIFFERENT DISTRIBUTED NETWORKS

BACKGROUND

Cloud computing services in which users run applications on virtual machines hosted a distributed network of servers are available from a number of different service providers. The cloud computing services may be hosted on a public cloud, such as a remote datacenter that host numerous tenant users. Cloud computing service may also be hosted on a private cloud, such as an enterprise datacenter that is available to a limited pool of users associated with the enterprise. Each cloud computing service provides its own proprietary user interface (UI) and application programming interfaces (API) that a must be used to access services on a particular public or private cloud.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide the ability to connect different clouds to provide an integrated UI experience and integrated API experience. UI integration is achieved by hosting multiple UI extensions, each serving UIs for different cloud services, in the same browser window. Each UI extension is initialized with all necessary contextual information about the corresponding cloud service, such as a list of subscriptions from that cloud and the necessary security tokens for accessing data in the cloud.

At the API level, a special connector service proxies calls across clouds and enables exposing all services from all clouds via a single management service. Resources, usage, and subscriptions on one cloud service may be accessed directly by other cloud services via the connector without requiring user action.

A single sign-in experience is possible federating identity providers. Different clouds can be connected so that subscriptions from a remote cloud can be imported in a local cloud. Alternatively, resources on a remote cloud may be linked into an existing subscription on a local cloud. The UI and API integration allows users to see resources and services coming from different clouds as if they came from one "integrated" or cloud.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
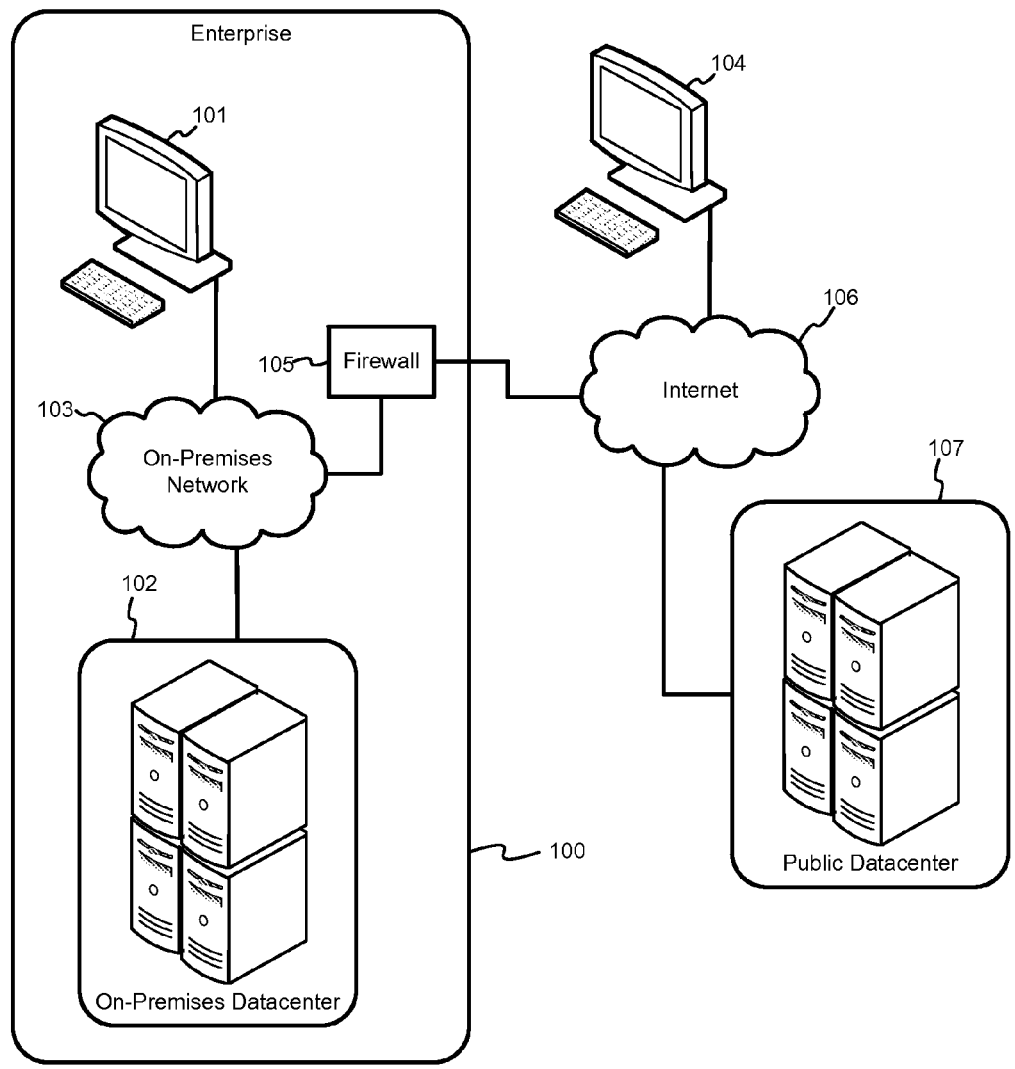
FIG. 1 is a high level block diagram of a system that provides enterprise users with access to local, on-premises resources and to remote or public resources.

FIG. 1 is a high level block diagram of a system that provides enterprise users with access to local, on-premises resources and to remote or public resources. Local enterprise terminal 101 allows users to directly access on-premises datacenter 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
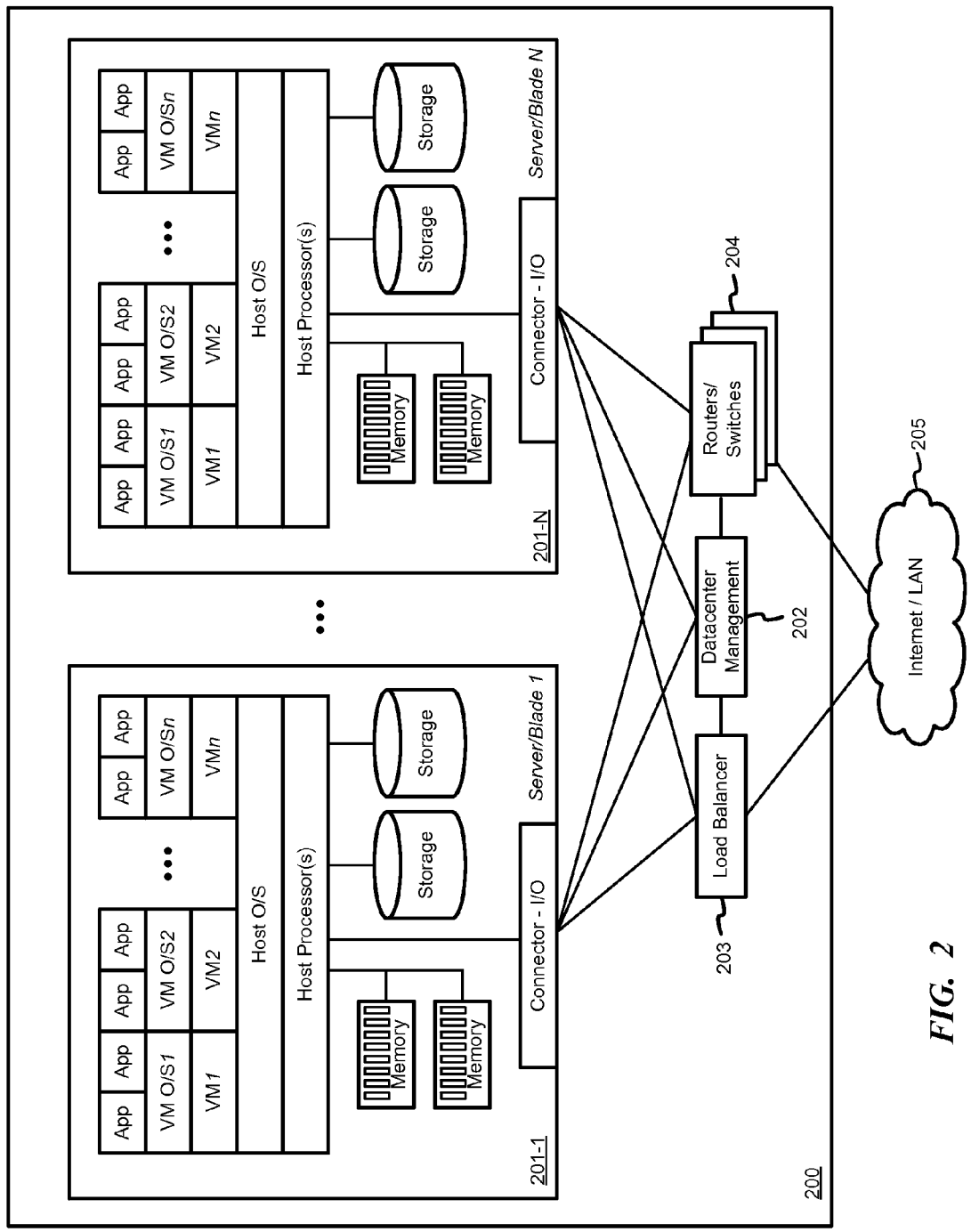
FIG. 2 is a block diagram of a datacenter that provides cloud computing services or distributed computing services according to one embodiment.

FIG. 2 is a block diagram of a datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which may be a local area network (LAN) in the case of an enterprise, on-premises datacenter 102 or the Internet in the case of a public datacenter (107).

Servers 201 may be traditional standalone computing devices and/or they may be configured as individual blades in a rack of many server devices. Servers 201 have an input/output (I/O) connector that manages communication with other database entities. One or more host processors on each server 201 run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like compute power, networking and storage as available as water from a faucet. As with any utility, you generally only pay for what you use with cloud computing. By tapping into cloud services, you can harness the power of massive data centers without having to build, manage or maintain costly, complex IT building blocks. With the cloud, much of the complexity of IT is abstracted away, letting you focus just on the infrastructure, data and application development that really matter to your business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, it will be understood that servers 201 may be distributed to multiple locations across the globe to provide additional redundancy and disaster recovery capabilities.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise. The use of both public cloud services and private cloud services by an enterprise is referred to generally as a hybrid cloud.

Different cloud computing services will require different APIs and different UIs. In a hybrid cloud situation, where some services are provided by private cloud computing, which runs on an on-premises datacenter for example, and other services are provided by a public cloud, enterprises must manage these different APIs and UIs and ensure they are using the correct API and UI for each cloud. Current cloud providers enable their individual cloud services can be consumed, but is not currently possible to consume services from multiple clouds via a single consistent user experience and single consistent API. Instead, current services are only offered in their own host cloud. As a result, when the same service is offered in different clouds, it is not currently possible to extend existing private cloud or on-premises services into a public cloud so that the same service UI and API can be used in an integrated way to access resources across different clouds.

Embodiments of the invention integrate services coming from different clouds and allow one service to configure itself to use another service. For example, a database service hosted in a private cloud may be configured to backup into a public cloud while the enterprise user only has to access one interface. Prior systems could not achieve this, but instead required users to open two UI applications and make different API calls to different clouds, using two different security mechanisms.

Figure 3:
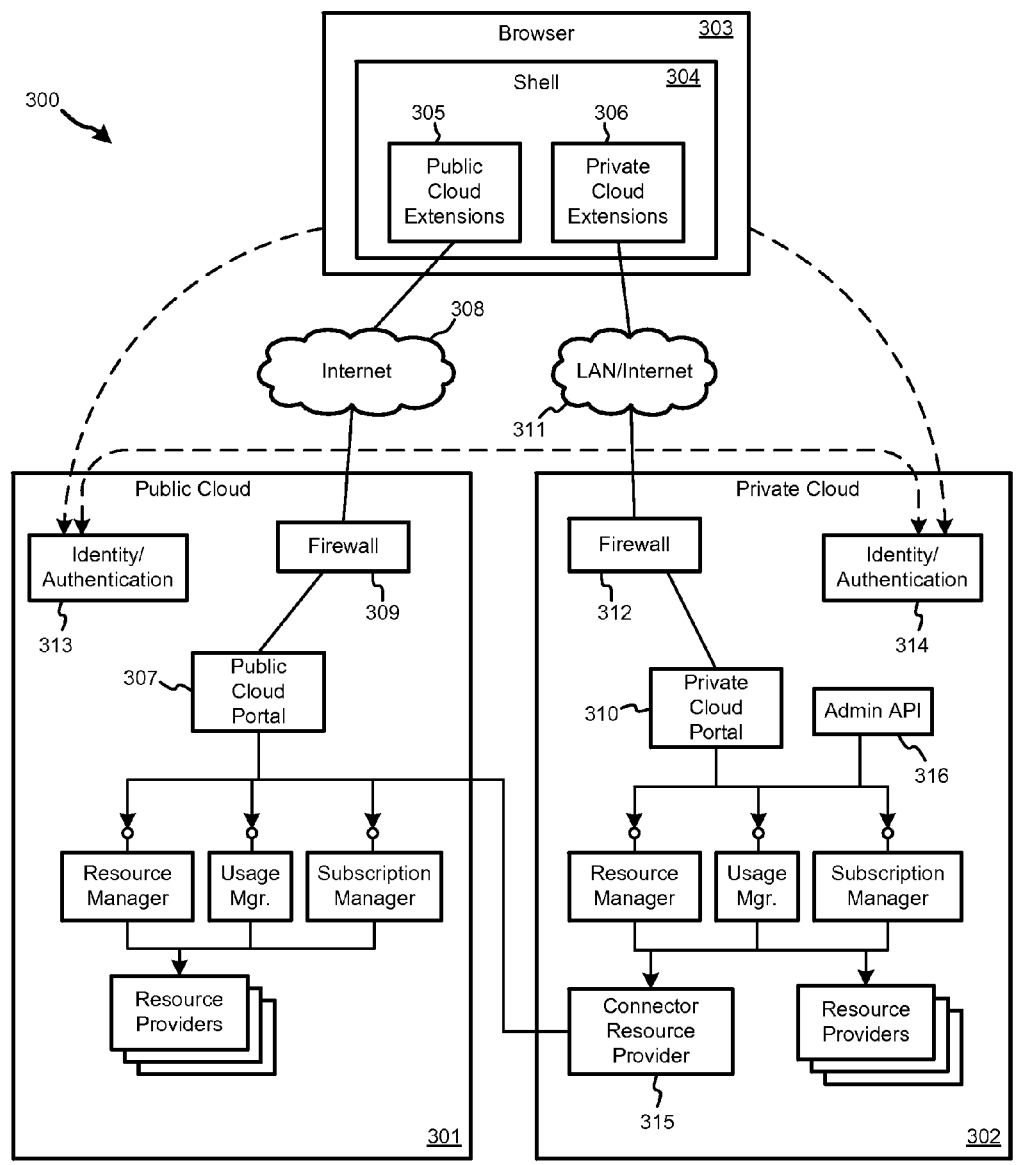
FIG. 3 is a block diagram illustrating one embodiment of a system for providing an integrated user interface and a consistent API for multiple cloud services.

FIG. 3 is a block diagram illustrating one embodiment of a system 300 for providing one user interface and a consistent API for multiple cloud services, such as a public or remote cloud 301 and a private or local cloud 302. Both clouds may provide similar services, such as database services, but the service on each cloud will have a different identity. The database services may have similar UIs, but the services that plug into the UIs will be different for each cloud. Embodiments of the present invention connect the different clouds in such a way that the user accesses a UI, such as via a browser 303, and consumes services from both clouds as if they were hosted on one cloud. The integrated UI hides the cloud boundaries from the user so that they can access and manage different cloud services under one UI. The user can select a desired interface for a selected service, such as using the database service UI for private cloud 301 to access database services from each cloud. Although the user is accessing different services on different clouds, the UI provides a seamless integration between them.

The integration of multiple clouds has two parts—an integrated UI and an integrated API. The example system in FIG. 3 illustrates providing an integrated UI on a browser 303. However, it will be understood that an integrated UI may be provided via other applications, such as an integrated development environment (IDE) or other tool, that access services or data on both clouds.

Browser 303 loads and initializes a shell 304, which loads a list of the user's cloud service subscriptions. The shell 304 may be JavaScript® that is loaded from a website, for example. Based upon the subscriptions, the shell can determine what assets and services the user is registered to use and where those are located in public cloud 301 or private cloud 302. For example, the user may be registered to manage VMs, websites, and/or SQL database services. Some of these services may be served from the public cloud 301 and other served locally from private cloud 302.

Shell 304 creates frames 305, 306 in the browser and points the frames to different websites that serves extensions for the different services to which the user is subscribed. Frames (e.g., HTML iframe) may be used in the browser to provide isolation between the cloud services. Public cloud extension 305 serves a UI from a website for the public cloud 301, and private cloud extension 306 services a UI from a website for the private cloud 302. Each frame 305, 306 receives its respective information and shell 304 coordinates the frames into a unified UI that is an assembly of the different extensions. Each extension is loaded from a different cloud and is adapted to enable a specific security context, such as identification and authentication, for that cloud. Shell 304 functions as a basic operating system that expects a certain implementation or format for the cloud extensions. As long as a compliant extension can be created, then shell 304 can create a frame for any cloud. For example, different extensions may be created to access cloud services running on Microsoft Azure, Windows Azure Pack (WAP), Amazon Web Services (AWS), Google Cloud Platform, etc. Shell 304 provides for the converging of UIs for multiple different homogenous and/or heterogeneous cloud services. The UI allows abstracting the cloud boundaries from the user to such a degree where user can be offered a mixed plan (where services or service regions are offered across cloud boundaries) without user even noticing visually the cloud boundary.

Shell 304 provides a cloud-management user experience can natively and seamlessly expand across cloud boundaries. Public cloud 301 and private cloud 302 may offer both the same and different services. Shell 304 loads native UI extensions for managing individual services across cloud boundaries. The appropriate version for managing each cloud service is loaded by the extension. For example, a newer version of a VM management service may be loaded for public cloud 301 compared to the version of VM management service loaded for private cloud 302.

Although FIG. 3 illustrates a system using a public and private cloud, it will be understood that the present invention can be used with any combination of cloud services. For example, browser 303 may provide a UI to two private clouds or to two public clouds. Shell 304 loads the appropriate extensions for the user's registered clouds services. In other embodiments, more than two cloud services may be accessed using browser 303. The update rates for each cloud will vary so that some clouds will have a more recent version of a service than other clouds. Shell 304 may be updated quickly using the extensions so that when a UI changes in one cloud, the newest version of the UI can be served to users by shell 304.

Service agnostic portions of shell 304 may load some parts from different clouds. Shell 304 identifies which cloud has the latest version of the UI and loads that newest version. Along with the latest version, the shell loads a "sandbox" that can load older versions of the UI. The sandbox makes the older version appear to the shell as if it is the newest version. This may be accomplished by performing appropriate API translations for the changes to the UI. While the older version of the API is used with a cloud having the old version, the shell loads the newer version of the service UIs for the user. As a result, users may be presented with an updated UI version even when navigating to older versions of the service on other clouds.

The theme presented on browser 303 may be standardized across different clouds. For example, when a newer version of a UI is loaded from public cloud 301, browser 304 may still use a local theme associated with private cloud 304, even if that theme was created for an older version of the service. This allows styling and customizations for one cloud to be presented to the user for all clouds.

In other embodiments, when the same services are offered both the public cloud 301 and private cloud 302, browser 303 may use a single UI extension to manage resources across both clouds. This single UI extension may be used even when the deployed services are different versions.

Browser 303 manages user identity so that using a log-on for private cloud 302 allows the user to also access resources on public cloud 302 and across all cloud boundaries.

Each cloud has a portal that accessed by the extension loaded on browser 304. Public cloud portal 307 provides an API framework appropriate for interfacing public cloud extension 305 to public cloud 301 across Internet 308. Firewall 309 provides security for public cloud 301. Extension 305 is configured to traverse firewall 309 as needed to access public cloud 301. Private cloud portal 310 provides an API framework appropriate for interfacing private cloud extension 306 to private cloud 302 across network 311. If browser 303 and private cloud 302 are in the same location, then network 311 may be a LAN or enterprise network. If browser 303 is remote from private cloud 302, then network 311 may be the Internet. Firewall 312 provides security for private cloud 302, such as when browser 303 accesses services over the Internet or other public network.

Portals 307 and 310 provide access to the resource manager, usage manager, and subscription manager on each cloud. The resource manager coordinates the resource providers, which may provide instances of VM, website, and database resources, for example. The usage manager monitors resource consumption for billing. The subscription manager maintains tenant subscriptions, including connectors, connected services, and quotas.

Clouds 301 and 302 may use role-based access control (RBAC) to control what administrators and tenants can do and to restrict access to authorized users based on the roles of individual users within an enterprise. Browser 303 connects to identity/authentication manager 313 or 314 as appropriate to verify users and to determine what access they should be provided on each cloud. The identity/authentication managers 313, 314 can also communicate with each other. This allows users to access one portal then look at both clouds. Identity/authentication manager 313 may use Azure Active Directory in one embodiment as a comprehensive identity and access management solution for public cloud 301. Identity/authentication manager 314 in private cloud 302 may be a Security Token Service (STS), for example, that acts as a security gateway to authenticate users and to issue security tokens carrying claims that describe the user.

Like the integrated UI, the integrated API provides a common interface for the clouds. This is accomplished, for example, using a connector resource provider 315 in private cloud, which is responsible for connecting to remote, public cloud 301. Connector resource provider 315 translates the native API for cloud 301 so that it is compatible with the resource provider contract in the other cloud. The connector resource provider 315 has the identical interface as the other resource providers on private cloud 302, but also includes a link to the remote cloud 301.

Connector resource provider 315 translates the resource manager API on private cloud 302 to the resource manager API used on public cloud 302. Connector resource provider 315 also translates the usage API on private cloud 302 to the usage API on public cloud 302. This allows, for example, resource consumption on the remote cloud to be used at the private cloud for aggregated billing. Connector resource provider 315 also translates the subscription management API on private cloud 302 to the subscription management API on public cloud 302. This allows the private cloud 302 to configure a quota that is enforced in public cloud 301 via the connector resource provider 315.

With the connector 315, when a user in private cloud 302 hits the local API endpoint, they will see a list of resources available from both private cloud 302 and public cloud 301 as if the resources were registered locally even though physically the resources are located on a remote cloud.

For example, the user may have a database service on the private cloud, but the public cloud may provide additional database services. Using the connector 315, the user will have access to those additional database services on the private cloud as if they were present locally.

Using this special connector service at the API level, connector 315 proxies calls across clouds and enables exposing all services from all clouds via a single management service.

Connector 315 federates identity across clouds 301 and 302 to provide a single sign-on procedure for users. Each cloud may use a different identify provider 313, 314 to connect to the API. Connector 315 allows the user to log-in to the private cloud 302 and to consume services from public cloud 301 without having to log-in again on public cloud 302. This may be accomplished in one embodiment by synchronizing identity and authentication directories 313 and 314.

In one embodiment, there are managed and unmanaged options for offering cross-cloud connectivity. Each option establishes a relationship between different clouds so that the user can access resources on both clouds. The user has a subscription to both clouds or needs services from both clouds and needs to manage that connection.

For unmanaged access, an end user is provided with un-scoped, ungoverned access to a subscription in a remote cloud from a local cloud's portal. The billing relationship with the remote cloud provider is owned by the end user. The remote subscription's services, quotas, and resources are not tied to the local subscription. The end user is privy to a subscription from the local cloud provider and a separate subscription from the remote cloud provider. The end user registers the remote subscription with the local cloud provider so that services in the remote cloud can be accessed.

For managed access, the end user is provided with scoped, governed access to a subscription in a remote cloud from the local cloud's portal. The billing relationship with the remote cloud is handled by the local cloud provider, and the billing relationship with the provider is handled by the end user. The remote subscription's services, quotas, and resources are mounted or appended with the local subscription's services, quotas, or resources. The end user is privy only to one subscription, which is from the local cloud provider.

An admin API 316 is used to register a remote, public cloud 301 with local, private cloud 302. The admin API 316 is used to make private cloud 302 aware of public cloud 301 so that private cloud 302 can bring in external resources from public cloud 301. Admin API 316 allows the user to link existing subscriptions on private cloud 302 to services that are available on public cloud 301. Alternatively, private cloud portal 310 is a tenant API that may be used to import existing subscriptions from public cloud 301 to provide access to services available on private cloud 302. The imported subscriptions are registered with private cloud 302 so that the user can access services from both clouds. This allows users to bring their own existing public cloud subscriptions to a private cloud account. The subscriptions are registered locally to allow the user to access the remote services. Usage managers on public cloud 301 can then associate resource use from the private cloud 302 with a particular subscription for billing.

For simplification, the examples described above use only two cloud services—a local or private cloud and a remote or public cloud. However, it will be understood that there is no limit on how many different clouds can be connected this way. The connector or multiple instances of the connector resource provider may be used to link one cloud service to one or more additional cloud services.

Figure 4:
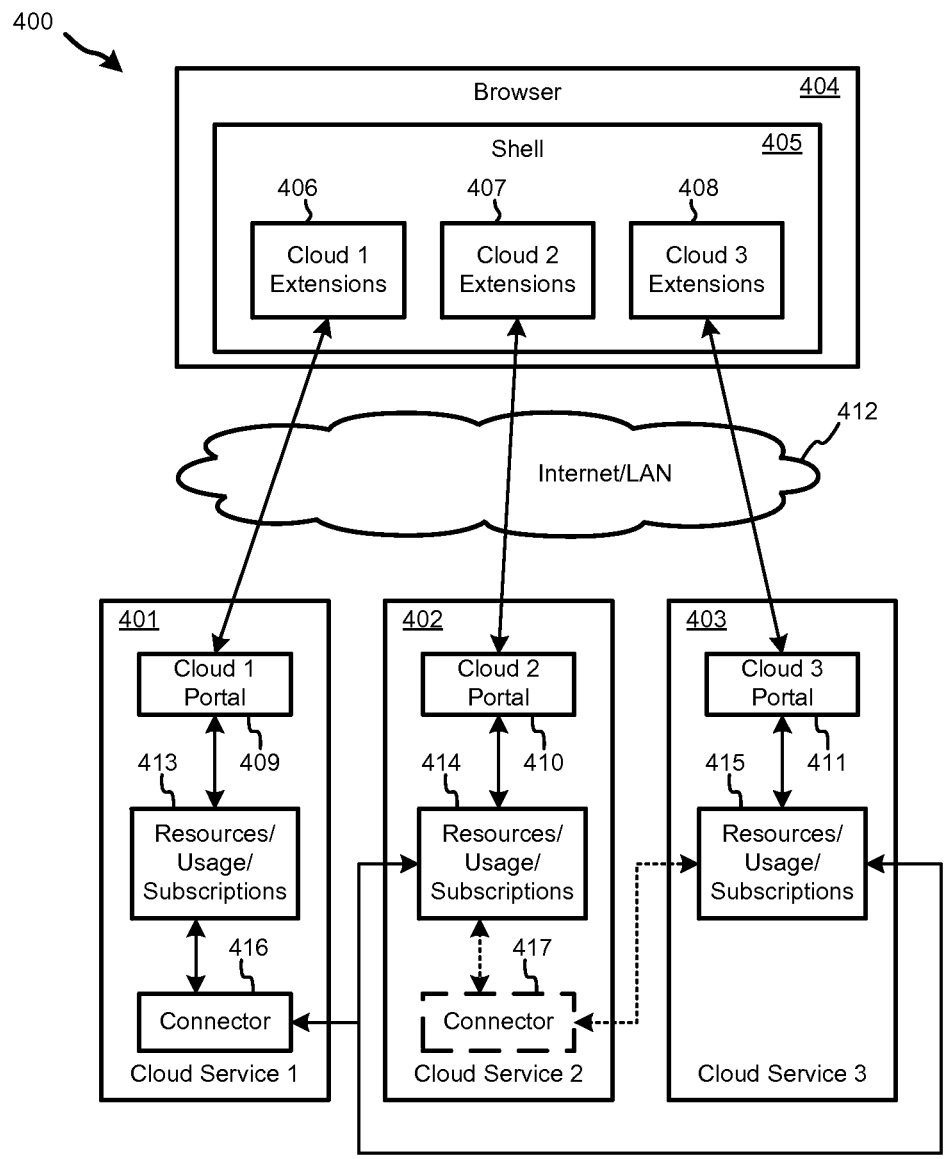
FIG. 4 illustrates a system using an integrated UI and an integrated API to link multiple cloud services.

FIG. 4 illustrates a system 400 using an integrated UI and an integrated API to link three cloud services. In this example, a user has subscriptions to services on from cloud services 401, 402, 403. These cloud services 401-403 may be any combination of private and/or public clouds. Cloud services 401-403 may be supported by different service providers, such as an enterprise IT department that maintains a private cloud service for a restricted user group or a remote service provider that maintains a public cloud service that is available to many tenants. Cloud services 401-403 may be located in datacenters that are remote from each other and that are maintained by the same or different providers. Alternatively, cloud services 401-403 may be co-located, but isolated sub-sections of the same datacenter.

Users access the cloud services using a browser 404. In different embodiments, browser 404 may be running on a machine that is remote from all of the cloud services 401-403 or that is co-located with one or more of the services, such as an enterprise machine co-located with a private cloud. Browser 404 loads shell 405, which loads a list of the user's cloud service subscriptions. Based upon the subscriptions, the shell can determine what assets and services the user is registered for and where those are located in cloud services 401-403. Shell 405 then loads native UI extensions 406, 407, 408 corresponding to cloud services 401-403, respectively. Shell 405 and cloud extensions 406-408 may be loaded, for example, from a locally hosted web page or from a remote web page hosted by one of the cloud services 401-403. Each of the cloud extensions 406-408 are adapted to connect to a cloud portal 409, 410, 411 for the corresponding cloud service 401-403.

Shell 405 creates frames in browser 404 and points the frames to cloud extensions for the cloud services to which the user is subscribed. Each frame receives its respective information and shell 405 coordinates the frames into a unified UI for the user. The extension 406-408 for each cloud is adapted to enable a specific security context for that cloud.

Cloud portals 409-411 provide an API framework appropriate for interfacing their respective cloud extension and cloud service across network 412, which may be an enterprise LAN or public Internet depending upon the location of the machine running browser 404 and each cloud service 401-403. Portals 409-410 provide access to resources, usage, and subscriptions 413, 414, 415 on each cloud service.

Connector 416 provides an integrated API that translates the native API for each cloud service so that it is compatible with the resource provider contract in other cloud services. Connector 416 translates the resource manager API on cloud service 401 to the resource manager, usage, and subscription management APIs used on cloud services 402 and 403. This allows the user to see a list of subscribed resources that are available across all of the cloud services 401-403. Those resources appear to the user as if they were registered locally on cloud service 401 even though the resources are physically located on a remote cloud 402, 403.

Connector 416 or multiple instances of connector 416 may be used to link one cloud service to multiple other cloud services. In other embodiments, a connector 417 on a remote cloud service 402 may be used to link services and resources between remote cloud services 402 and 403. This would allow the resources to which the user is subscribed on cloud service 402 to directly access related resources on cloud service 403 without requiring action from cloud service 401, which would be a third-party to that transaction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    a processor and a memory containing instructions executable by the processor to cause the processor to perform a process comprising:
        receiving, at a private cloud, log-on information from a user; and
        in response to and based on the received log-on information,
            providing access to a local resources on a local network of the private cloud to the user, the local resource being configured to provide a corresponding computing services to the user at the private cloud;
            identifying a registration at the private cloud of a remote resource provided by a public cloud interconnected with the private cloud via a computer network, the remote resource being configured to provide an additional computing service to the user at the public cloud; and
            based on the identified registration, providing access to the remote resource to the user from the private cloud via the computer network by establishing an interface between the local resources at the private cloud and the remote resources at the public cloud, wherein the established interface is configured to translate an application programming interface ("API") associated with the local resource at the private cloud and another API associated with the remote resources at the public cloud.

2. The computing system of claim 1, further comprising:
    a local portal providing access to the remote resource in the public cloud without restriction on the identified subscription by the local network.

3. The computing system of claim 1, further comprising:
    a local portal providing access to the identified remote resource in the public cloud, wherein the identified subscription is managed by the local network.

4. The computing system of claim 1, wherein the process performed by the processor further includes imposing a resource consumption quota associated with the remote resource at the public cloud, and wherein the interface is configured to enforce the imposed quota for services provided by the remote resource at the public cloud.

5. The computing system of claim 1, wherein the interface is configured to identify a user subscriptions associated with the local resources and to apply the identified user subscriptions to the remote resources.

6. The computing system of claim 1, wherein the interface is configured to identify a user subscriptions associated with the remote resources and to apply the identified user subscriptions to the local resources.

7. The computing system of claim 1, wherein the interface is configured to identify a user subscriptions associated with a plurality of resources and to apply the identified subscriptions to the remote resource.

8. A method performed in a computing device is a private cloud, the method comprising:
    receiving, at the private cloud, log-on information from a user; and
    in response to and based on the received log-on information,
        providing access to a local resource on a local network of the private cloud to the user, the local resource being configured to provide a corresponding computing service to the user at the private cloud;
        identifying a registration at the private cloud of a remote resource provided by a public cloud interconnected with the private cloud via a computer network, the remote resource being configured to provide an additional computing service to the user at the public cloud; and
        based on the identified registration,
            establishing an interface between the local resource at the private cloud and the remote resource at the public cloud, wherein the established interface is configured to translate an application programming interface ("API") associated with the local resource at the private cloud and another API associated with the remote resource at the public cloud; and
            providing access to the remote resource to the user from the private cloud via the established interface.

9. The method of claim 8 wherein:
    receiving the log-on information includes receiving the log-on information at a portal of the private cloud; and
    in response to and based on the received log-on information, authenticating the user with the public cloud using the received log-on information at the private cloud without having to separately log-in to the public cloud.

10. The method of claim 8 wherein:
    the established interface includes a resource provider in the private cloud configured to provide access to the remote resource in the public cloud; and
    the resource provider includes a link to the public cloud via the computer network.

11. The method of claim 8 wherein:
    the local resource includes a first database service associated with a first API in the private cloud;
    the remote resource includes a second database service associated with a second API in the public cloud; and
    the established interface is configured to translate between the first API in the private cloud and the second API in the public cloud.

12. The method of claim 8 wherein:
    the private cloud includes a first subscription management API;
    the public cloud includes a second subscription management API; and the method further includes allowing the private cloud to configure a usage quota enforceable at the public cloud by using the established interface to translate between the first subscription management API in the private cloud and the second subscription management API in the public cloud.

13. The method of claim 8 wherein providing access to the remote resource includes utilizing the established interface to proxy calls between the private cloud and the public cloud.

14. The method of claim 8, further comprising based on the identified registration, appending at least one of the remote service, a remote quota associated with the remote service, and remote resources provided by the remote service to the local service, a local quota, and local resource provided by the local service, respectively.

15. The method of claim 8, further comprising importing, into the private cloud, the subscription of the user to the remote resource provided by the public cloud, and wherein identifying the registration includes identifying the registration based on the imported subscription of the user to the remote resource provided by the public cloud.

16. A method performed in a computing device is a private cloud, the method comprising:
   receiving, at the private cloud, log-on information from a user; and
   in response to and based on the received log-on information,
      providing access to a local resource on a local network of the private cloud to the user, the local resource being configured to provide a corresponding computing service to the user at the private cloud;
      identifying a registration at the private cloud of a remote resource provided by a public cloud interconnected with the private cloud via a computer network, the remote resource being configured to provide an additional computing service to the user at the public cloud; and
      based on the identified registration, providing access to the remote resource to the user from the private cloud via an application programming interface ("API") interface between the local resource at the private cloud and the remote resource at the public cloud, wherein the API interface is configured to translate an API associated with the local resource at the private cloud and another API associated with the remote resource at the public cloud.

17. The method of claim 16 wherein:
receiving the log-on information includes receiving the log-on information at a portal of the private cloud; and
in response to and based on the received log-on information, authenticating the user with the public cloud using the received log-on information at the private cloud without having to separately log-in to the public cloud.

18. The method of claim 16 wherein:
the API interface includes a resource provider in the private cloud configured to provide access to the remote resource in the public cloud; and
the resource provider includes a link to the public cloud via the computer network.

19. The method of claim 16 wherein:
the local resource includes a first database service associated with a first API in the private cloud;
the remote resource includes a second database service associated with a second API in the public cloud; and
the API interface is configured to translate between the first API in the private cloud and the second API in the public cloud.

20. The method of claim 16 wherein:
the private cloud includes a first subscription management API;
the public cloud includes a second subscription management API; and
the method further includes allowing the private cloud to configure a usage quota enforceable at the public cloud by using the API interface to translate between the first subscription management API in the private cloud and the second subscription management API in the public cloud.

* * * * *